United States Patent

[11] 3,617,573

| [72] | Inventor | Daniel J. Monagle |
| | | Wilmington, Del. |
| [21] | Appl. No. | 873,673 |
| [22] | Filed | Nov. 3, 1969 |
| [45] | Patented | Nov. 2, 1971 |
| [73] | Assignee | Hercules Incorporated |
| | | Wilmington, Del. |

[54] WATER-SOLUBLE COPOLYMERS IN FLOCCULATION OF INORGANIC PARTICLES
3 Claims, No Drawings

[52] U.S. Cl. ..................................................... 210/54, 260/79.3
[51] Int. Cl. ..................................................... B01d 21/01
[50] Field of Search ........................................... 210/52–54; 260/79.3, 80

[56] References Cited
UNITED STATES PATENTS
3,493,500  2/1970  Volk et al. ..................... 210/54
FOREIGN PATENTS
842,563  7/1960  Great Britain ................ 260/79.3

Primary Examiner—Reuben Friedman
Assistant Examiner—Thomas G. Wyse
Attorney—Lewis H. Wilson ABSTRACT: Predominantly inorganic, water-insoluble particles suspended in aqueous salt solutions are flocculated and settled by adding to the solution a water-soluble copolymer of acrylamide and an alkali metal or ammonium salt of a sulfoalkyl acrylate. Preferred copolymer is acrylamide —sodium sulfoproplly acrylate.

WATER-SOLUBLE COPOLYMERS IN FLOCCULATION OF INORGANIC PARTICLES

This invention relates to the flocculation and settling of predominately inorganic, suspended particles in salt solutions. In particular, it relates to such flocculation with a high molecular weight, water-soluble anionic polyelectrolyte polymer. In a specific embodiment, it relates to the removal of suspended clay particles from salt solutions employed in treatment of mineral ores.

Water-soluble anionic polyelectrolyte polymers based on acrylamide and/or acrylic acid are widely known and used as flocculants for separating small, suspended particles of predominately inorganic material from aqueous media. However, most of these polyelectrolyte polymers lose a significant amount of their effectiveness when used in the presence of salt solutions.

One exemplary area where this loss of effectiveness is a problem is in the refinement of water-soluble ores. Such ores, as mined, generally contain a significant amount of clay or other inorganic, insoluble matter. This clay is removed by agitating the ore in a saturated salt solution and then decanting (desliming) the resultant clay suspension. The decanted liquid normally contains up to about 5 percent suspended clay solids which is allowed to settle out and the salt solution is returned to the system for reuse. To reduce the time required for such settling, a flocculant and settling aid is added to the system.

In accordance with this invention, it has been found that copolymers of acrylamide and a sulfoalkyl acrylate salt are excellent flocculants and settling aids for inorganic suspended materials in salt solutions. Specifically, copolymers containing about 60 to 98 percent by weight of acrylamide and 2 to 40 percent by weight of sulfoalkyl acrylate salt, having a reduced specific viscosity (RSV) of at least about 5, have been found to promote rapid flocculation and settling of such suspended materials. Most preferably, the copolymer contains about 85 to 98 percent by weight acrylamide and 2 to 15 percent by weight of the sulfoalkyl acrylate salt. Usually, the amount of the copolymer employed will be about 0.01 to 1 pound/ton, and preferably about 0.01 to 0.5 pound/ton, of suspended clay in the solution. The amount to be used will vary, depending upon the nature and amount of clay in the mixture being treated.

The sulfoalkyl acrylate salt of the copolymer is an ester of acrylic acid and an alkali metal or ammonium salt of a hydroxyalkyl sulfonic acid having the formula $H-O-R-SO_3M$, wherein M is an alkali metal or ammonium radical, and R is an alkylene radical having two to four carbon atoms with the two valences on different carbon atoms. Typical salts in this class are sodium sulfopropyl acrylate, sodium sulfoethyl acrylate, potassium sulfopropyl acrylate, sodium sulfobutyl acrylate, etc. The sodium salts are preferred.

The following examples illustrate the present invention in several of its embodiments. In these examples and elsewhere herein, unless otherwise indicated, parts and percentages are by weight and RSV is measured on a 0.1 percent solution of the copolymer in 0.1 M KCl at 25° C.

EXAMPLE 1

A sample of sylvinite ore from the Carlsbad district of New Mexico was scrubbed in the conventional manner in the presence of a saturated solution of the same ore. Solids content of the ore-brine mixture was about 50 percent. This was screened on a 30-mesh screen, to remove fines. The filtered brine contained about 1 percent solids, mostly clay particles, suspended therein.

Specimens of the brine-clay suspension (filtrate) were treated with varying amounts of a copolymer containing 90 percent acrylamide and 10 percent sodium sulfopropyl acrylate, having an RSV of about 15. Thus the specified amount of copolymer was added to a sample of the filtrate in a graduated cylinder and the mass was thoroughly agitated to assure complete mixing of filtrate and copolymer. The settling rates of these suspensions and of a control containing no flocculant are recorded in table 1.

Table 1

| Flocculant Concentration lbs./ton | Settling Rate inches/minute |
| --- | --- |
| None (Control) | 0.144 |
| 0.13 | 0.393 |
| 0.27 | 0.762 |
| 0.4 | 1.000 |

By contrast, the settling rate of a suspension treated with a commercially available flocculant comprises of a 90 percent acrylamide—10 percent sodium acrylate copolymer was 0.54 inch/minute at the 0.4 pound/ton level.

EXAMPLE 2

A second sylvinite specimen from the same Carlsbad, N.M. area as used in example 1, but having slightly higher clay content was treated in substantially the same manner as set forth in example 1. The filtrate contained 1.5 percent suspended clay. Settling rates for various flocculant concentration levels are shown in table 2.

Table 2

| Flocculant Concentration lbs./ton | Settling Rate inches/minute |
| --- | --- |
| None (Control) | 0.001 |
| 0.13 | 0.020 |
| 0.27 | 0.042 |
| 0.4 | 0.098 |
| 0.6 | 0.137 |

EXAMPLE 3

The slimes from the ore employed in example 1 containing about 1 percent suspended clay were mixed with various amounts of a 92 percent acrylamide, 8 percent sodium sulfopropyl acrylate polymer (RSV 21) and settling rates shown in table 3 were measured.

Table 3

| Flocculant Concentration lbs./ton | Settling Rate inches/minute |
| --- | --- |
| 0 | 0.58 |
| 0.1 | 2.3 |
| 0.2 | 2.3 |
| 0.4 | 2.3 |

In commercial practice, the highest possible settling rate is desirable. The flocculants of this invention exhibit higher rates in the sylvinite system than other good commercially available flocculants as demonstrated in example 1.

EXAMPLES 4 to 11

To demonstrate the flocculating ability of the copolymers of this invention, a series of 5 percent dispersions of kaolin clay in salt solutions were prepared. To each of these was added various concentrations of a 92/8 acrylamide—sodium sulfopropyl acrylate copolymer (RSV 21). The specified amount of copolymer was added to the solution in the graduated 100 ml. cylinder, the mass was thoroughly mixed and the volume of supernatant liquid was noted periodically. Flocculation rates are recorded in the following tables.

TABLE 4

| Example | Salt solution | Flocculant concentration (lbs./ton) | Supernatant volume (ml.) | | | | | |
|---|---|---|---|---|---|---|---|---|
| | | | 0.5 min. | 1 min. | 2 min. | 3 min. | 4 min. | 5 min. |
| 4 | 5% sodium nitrate | 0 | 0 | 1 | 2 | 4 | 5 | 6 |
| | | 0.2 | 20 | 43 | 60 | 67 | 70 | 73 |
| | | 0.4 | 23 | 43 | 58 | 65 | 69 | 72 |
| | | 0.8 | 50 | 65 | 72 | 75 | 76 | 77 |

TABLE 5

| Example | Salt solution | Flocculant concentration (lbs./ton) | Supernatant volume (ml.) | | | | | |
|---|---|---|---|---|---|---|---|---|
| | | | 0.5 min. | 1 min. | 2 min. | 3 min. | 4 min. | 5 min. |
| 5 | 2% calcium chloride | 0 | 0 | 1 | 2 | 3 | 5 | 6 |
| | | 0.2 | 11 | 29 | 49 | 58 | 63 | 67 |
| | | 0.4 | 14 | 33 | 53 | 61 | 65 | 69 |
| | | 0.8 | 34 | 56 | 67 | 71 | 73 | 75 |

TABLE 6

| Example | Salt solution | Flocculant concentration (lbs./ton) | Supernatant volume (ml.) | | | | | |
|---|---|---|---|---|---|---|---|---|
| | | | 0.5 min. | 1 min. | 2 min. | 3 min. | 4 min. | 5 min. |
| 6 | 5% sodium acetate | 0 | 0 | 0 | 0 | 1 | 1 | 2 |
| | | 0.2 | 9 | 27 | 49 | 57 | 62 | 65 |
| | | 0.4 | 19 | 39 | 58 | 64 | 69 | 71 |
| | | 0.8 | 45 | 60 | 69 | 72 | 75 | 76 |

TABLE 7

| Example | Salt solution | Flocculant concentration (lbs./ton) | Supernatant volume (ml.) | | | | | |
|---|---|---|---|---|---|---|---|---|
| | | | 0.5 min. | 1 min. | 2 min. | 3 min. | 4 min. | 5 min. |
| 7 | 2% sodium carbonate | 0 | 0 | 0 | 1 | 1 | 2 | 3 |
| | | 0.1 | 17 | 32 | 55 | 63 | 67 | 70 |
| | | 0.2 | 45 | 66 | 76 | 78 | 79 | 80 |
| | | 0.4 | 75 | 78 | 82 | 83 | 84 | 84 |
| | | 0.8 | 81 | 83 | 83 | 84 | 84 | 85 |

TABLE 8

| Example | Salt solution | Flocculant concentration (lbs./ton) | Supernatant volume (ml.) | | | | | |
|---|---|---|---|---|---|---|---|---|
| | | | 0.5 min. | 1 min. | 2 min. | 3 min. | 4 min. | 5 min. |
| 8 | 5% disodium acid phosphate | 0 | 0 | 0 | 1 | 1 | 3 | 4 |
| | | 0.1 | 11 | 26 | 50 | 56 | 64 | 68 |
| | | 0.2 | 25 | 46 | 63 | 67 | 70 | 75 |
| | | 0.4 | 43 | 71 | 76 | 77 | 79 | 80 |

TABLE 9

| Example | Salt solution | Flocculant concentration (lbs./ton) | Supernatant volume (ml.) | | | | | |
|---|---|---|---|---|---|---|---|---|
| | | | 0.5 min. | 1 min. | 2 min. | 3 min. | 4 min. | 5 min. |
| 9 | 1% sodium sulfate | 0 | 0 | 0 | 1 | 2 | 4 | 8 |
| | | 0.1 | 11 | 26 | 43 | 56 | 61 | 65 |
| | | 0.2 | 20 | 41 | 60 | 67 | 70 | 74 |
| | | 0.4 | 45 | 65 | 73 | 76 | 78 | 78 |
| | | 0.8 | 64 | 74 | 79 | 79 | 80 | 81 |

TABLE 10

| Example | Salt solution | Flocculant concentration (lbs./ton) | Supernatant volume (ml.) | | | | | |
|---|---|---|---|---|---|---|---|---|
| | | | 0.5 min. | 1 min. | 2 min. | 3 min. | 4 min. | 5 min. |
| 10 | 2% sodium sulfate | 0 | 0 | 0 | 1 | 2 | 4 | 6 |
| | | 0.1 | 8 | 18 | 36 | 50 | 58 | 62 |
| | | 0.2 | 8 | 20 | 40 | 54 | 60 | 65 |
| | | 0.4 | 37 | 59 | 70 | 72 | 75 | 77 |
| | | 0.8 | 64 | 72 | 77 | 79 | 80 | 80 |

TABLE 11

| Example | Salt solution | Flocculant concentration (lbs./ton) | Supernatant volume (ml.) | | | | | |
|---|---|---|---|---|---|---|---|---|
| | | | 0.5 min. | 1 min. | 2 min. | 3 min. | 4 min. | 5 min. |
| 11 | 10% sodium sulfate | 0 | 0 | 0 | 0 | 2 | 4 | 6 |
| | | 0.1 | 3 | 5 | 20 | 36 | 45 | 50 |
| | | 0.2 | 3 | 9 | 30 | 45 | 53 | 57 |
| | | 0.4 | 10 | 27 | 50 | 59 | 63 | 67 |
| | | 0.8 | 36 | 58 | 68 | 71 | 74 | 76 |

EXAMPLE 12

A 50 percent aqueous slurry of uranium ore containing about 0.07% $U_2O_3$ was ball milled and leached for 44 hours in sulfuric acid at a pH of 1.5. The resulting uranium sulfate solution was diluted with water to reduce the insolubles content to 10 percent. This material was treated with the 92/8 copolymer and the settling rates are recorded in table 12.

Table 12

| Flocculent Concentration (lbs./ton) | Supernatant Volume (ml.) | | | | | |
|---|---|---|---|---|---|---|
| | 0.5 | 1 | 2 | 3 | 4 | 5 minutes |
| 0 | 0 | 1 | 2 | 2 | 3 | 4 |
| 0.2 | 5 | 14 | 30 | 40 | 47 | 51 |
| 0.4 | 33 | 53 | 64 | 68 | 70 | 72 |
| 0.8 | 66 | 71 | 74 | 75 | 75 | 75 |

EXAMPLE 13

A 50 percent aqueous slurry of copper ore containing about 2.2 % copper silicate was ball milled, then leached with sulfuric acid to a pH of 1.6 for about 2 hours. The resulting copper sulfate solution was diluted with water to reduce the insolubles content to 20 percent. This material was treated with the 92/8 copolymer and the settling rates are recorded in table 13.

Table 13

| Flocculant Concentration (lbs./ton) | Supernatant Volume (ml.) | | | | | |
|---|---|---|---|---|---|---|
| | 0.5 | 1 | 2 | 3 | 4 | 5 minutes |
| 0 | 0 | 0 | 1 | 1 | 2 | 3 |
| 0.6 | 2 | 4 | 6 | 9 | 15 | 19 |
| 0.8 | 29 | 40 | 45 | 48 | 49 | 51 |
| 1.0 | 38 | 44 | 48 | 51 | 52 | 53 |

It is known how to prepare the anionic copolymers employed in the process of this invention and of the anionic acrylamide—sodium acrylate copolymers exemplified as a comparator in the examples. For example, preparation of the copolymers can be accomplished substantially as set forth in U.S. Pat. No. 3,336,269 and 3,336,270.

The following is a specific example wherein the process described in the above patents was used in preparing one of the copolymers employed in the present invention.

To a glass reactor were charged 200 parts of distilled water, 112.5 parts of acrylamide, 131 parts of tertiary butanol, 0.25 part of a nonionic surfactant, 12.5 parts of sodium sulfopropyl acrylate (as 23.3 percent solution in water), and 0.03 part of potassium persulfate. The pH was adjusted to 5.1 by addition of $H_2SO_4$. The solution was heated to 45° C., and the atmosphere and dissolved air were replaced with nitrogen by a series of evacuations and repressurizations. The pressure was then adjusted to 140 mm./Hg to maintain reflux. Then 3.2 parts of a 1 percent aqueous solution of tetramethylenediamine was added at a uniform rate during 1.5 hours. Refluxing the reaction mixture was continued for an additional 1.5 hours. Polymerization occurred and the copolymer precipitated during this 3-hour period. The copolymer was washed with acetone and dried in a vacuum oven at 50° C. There was obtained 112 parts of copolymer. Analyses of copolymer indicated it contained 90 weight percent acrylamide and 10 weight percent sodium sulfopropyl acrylate. The copolymer had an intrinsic viscosity ($[\eta]$) of 15.0 as measured in 0.1 M KCl solution at 25° C. A 1.0 percent aqueous solution was viscous, with a Brookfield viscosity of 640 cps. when measured with a number 3 spindle at 60 r.p.m. with a Brookfield LVF model viscometer.

What I claim and desire to protect by Letters Patent is:

1. A process for flocculating and settling predominantly inorganic particles from suspension in an aqueous salt solution which comprises adding to said suspension a water-soluble copolymer consisting essentially of acrylamide and an alkali metal or ammonium salt of a sulfoalkyl acrylate.

2. A process for flocculating and settling predominantly inorganic particles from suspension in a salt solution which comprises adding to said suspension, per ton of suspended clay, about 0.01 to 1 pound of a water-soluble copolymer consisting essentially of 85 to 98 percent by weight acrylamide and 15 to 2 percent by weight of an alkali metal salt of a sulfoalkyl acrylate, said copolymer having an RSV of at least about 5 measured in a 0.1 percent solution in 0.1M KCl at 25°C.

3. The process of claim 2 where the alkali metal salt in the copolymer is sodium sulfopropyl acrylate.

* * * * *